(12) United States Patent
Jung

(10) Patent No.: US 7,710,241 B2
(45) Date of Patent: May 4, 2010

(54) MOBILE COMMUNICATION TERMINAL AND METHOD FOR PROVIDING RFID TECHNIQUE

(75) Inventor: Hyun-Ho Jung, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 336 days.

(21) Appl. No.: 11/670,050

(22) Filed: Feb. 1, 2007

(65) Prior Publication Data

US 2007/0181665 A1   Aug. 9, 2007

(30) Foreign Application Priority Data

Feb. 2, 2006   (KR) ...................... 10-2006-0010221

(51) Int. Cl.
*H04Q 5/22* (2006.01)

(52) U.S. Cl. .................. 340/10.5; 340/10.1; 340/10.51; 340/10.4; 340/10.42; 340/7.39; 340/691.1; 455/550.1; 455/557; 455/456.1; 455/456.4; 455/456.6; 235/375; 712/1

(58) Field of Classification Search ................ 235/375; 713/1; 340/7.39; 455/550.1, 557
See application file for complete search history.

(56) References Cited

U.S. PATENT DOCUMENTS

| | | | |
|---|---|---|---|
| 6,823,199 B2 * | 11/2004 | Gough | 455/567 |
| 7,224,963 B2 * | 5/2007 | Anderson et al. | 455/414.3 |
| 7,263,374 B2 * | 8/2007 | Fan et al. | 455/456.4 |
| 7,426,197 B2 * | 9/2008 | Schotten et al. | 370/328 |
| 2002/0039909 A1 * | 4/2002 | Rankin | 455/558 |
| 2002/0132610 A1 * | 9/2002 | Chaplin et al. | 455/414 |
| 2002/0142792 A1 * | 10/2002 | Martinez | 455/550 |
| 2004/0166807 A1 * | 8/2004 | Vesikivi et al. | 455/41.2 |
| 2007/0032225 A1 * | 2/2007 | Konicek et al. | 455/417 |
| 2007/0032261 A1 * | 2/2007 | Boyer et al. | 455/550.1 |

FOREIGN PATENT DOCUMENTS

KR   10-2005-0021612 A   3/2005

* cited by examiner

*Primary Examiner*—Daniel Wu
*Assistant Examiner*—Ryan W Sherwin
(74) *Attorney, Agent, or Firm*—Lee, Hong, Degerman, Kang & Waimey

(57) ABSTRACT

A mobile communication terminal and method for providing an RFID technique is provided. The terminal includes an RFID reader unit for receiving identification information from an RFID tag and a controller for detecting a pre-set theme corresponding to the identification information and outputting a control signal based on the detected theme.

20 Claims, 3 Drawing Sheets

MOBILE COMMUNICATION TERMINAL AND METHOD FOR PROVIDING RFID TECHNIQUE

CROSS-REFERENCE TO RELATED APPLICATIONS

Pursuant to 35 U.S.C. §119(a), this application claims the benefit of earlier filing date and right of priority to Korean Patent Application No. 10-2006-0010221, filed on Feb. 2, 2006, the contents of which is hereby incorporated by reference herein in its entirety.

FIELD OF THE INVENTION

The present invention is directed to a mobile communication terminal and, more particularly, to a mobile communication terminal and method for providing an RFID (Radio Frequency Identification) technique to improve user convenience.

DESCRIPTION OF THE RELATED ART

Generally, a mobile communication terminal is a device with which a user can wirelessly page another party and be wirelessly connected for communication any time and anywhere. This can be achieved by a mobile switching center (MSC) controlling switching while traveling in a service area managed by a base station (BS) and allows data communication of symbols, numbers or characters and multimedia communication including an image signal, as well as voice communication. Mobile communication terminals having a large display unit and a camera capable of capturing video are also being actively developed.

Mobile communication terminals provide various supplementary functions in addition to a communication function in order to enhance convenience and utilization of communication. Users have many preferences related to the supplementary functions of the mobile communication terminals.

In a related art mobile communication terminal, a user can selectively change one or more supplementary functions related to text, audio and images, such as a font, a bell sound, a termination mode, a background screen, a menu screen, an icon or a color. For example, a user can change the termination mode of a mobile communication terminal from a bell sound to vibration when entering a conference room for a conference or an appointment in order to minimize any influence that the termination mode may have on other people in the conference room.

However, the related art mobile communication terminal has a problem in that the user must selectively set at least one or more supplementary functions. The user must set the supplementary function according to circumstances, as necessary, thereby causing user inconvenience.

SUMMARY OF THE INVENTION

One object of the present invention is to provide a mobile communication terminal and method for providing an RFID (Radio Frequency Identification) technique capable of enhancing user convenience by receiving identification information from an RFID tag and applying a pre-set theme corresponding to the identification information.

In one aspect of the present invention, a mobile communication terminal for providing an RFID technique is provided. The mobile communication terminal includes an RFID reader unit adapted to receive identification information from an RFID tag and a controller adapted to detect a pre-set theme corresponding to the identification information and output a control signal according on the detected theme.

It is contemplated that the terminal further includes a memory adapted to store at least one identification information and a theme corresponding to the identification information. It is further contemplated that the controller is further adapted to set at least one supplementary function according to the control signal.

It is contemplated that the at least one supplementary function is related to one of characters, audio and images. It is further contemplated that the at least one supplementary function is one of a font, a bell sound, an incoming call notification, a background screen, a menu screen, an icon and colors.

It is contemplated that the terminal further includes at least one of a display unit and an audio processing unit adapted to receive the control signal from the controller to set the at least one supplementary function. It is further contemplated that the RFID reader unit is further adapted to transmit power to the RFID tag and receive identification information from the RFID tag. Preferably, the at least one RFID tag is installed at pre-set positions.

In another aspect of the present invention, a method for providing an RFID technique is a mobile communication terminal is provided. The method includes receiving identification information from an RFID tag, detecting a pre-set theme corresponding to the identification information and outputting a control signal according to the detected theme.

It is contemplated that the method further includes storing at least one identification information and a theme corresponding to the identification information. It is further contemplated that the method further includes setting at least one supplementary function according to the control signal.

It is contemplated that the at least one supplementary function is related to one of characters, audio and images. It is further contemplated that the at least one supplementary function is one of a font, a bell sound, an incoming call notification, a background screen, a menu screen, an icon and colors.

It is contemplated that the method further includes determining if the received identification information matches stored identification information. It is further contemplated that the method further includes transmitting power to the RFID tag and receiving identification information from the RFID tag, Preferably, the method further includes installing at least one RFID tag at pre-set positions.

In another aspect of the present invention, a method for providing an RFID technique is a mobile communication terminal is provided. The method includes receiving identification information from an RFID tag, determining that the received identification information matches stored identification information, detecting a pre-set theme corresponding to the identification information, outputting a control signal according to the detected theme and setting at least one supplementary function according to the control signal.

It is contemplated that the at least one supplementary function is related to one of characters, audio and images. It is further contemplated that the at least one supplementary function is one of a font, a bell sound, an incoming calf notification, a background screen, a menu screen, an icon and colors. Preferably, the method further includes transmitting power to the RFID tag and receiving identification information from the RFID tag.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

A mobile communication terminal and method for providing an RFID technique capable of enhancing user convenience by receiving identification information from an RFID tag and applying a pre-set theme corresponding to the identification information according to exemplary embodiments of the present invention will be described with reference to the accompanying drawings. The RFID technique is a non-contact recognition method, which is a technique by which an RFID reader unit recognizes specific identification information from an RFID tag in order to identify an object. Because the RFID tag has a small size and is operable at a low power level and the identification information of the RFID tag theoretically cannot be duplicated, the RFID technique can be applied for various fields.

The RFID reader unit transmits an RF signal of a particular frequency band to the RFID tag and the RFID tag modulates and transmits the received RF signal. The RFID tag, which is operated by using an RF signal transmitted from the RFID reader unit, is divided into a low frequency method used for a short distance and a high frequency method used for a long distance.

Figure 1:
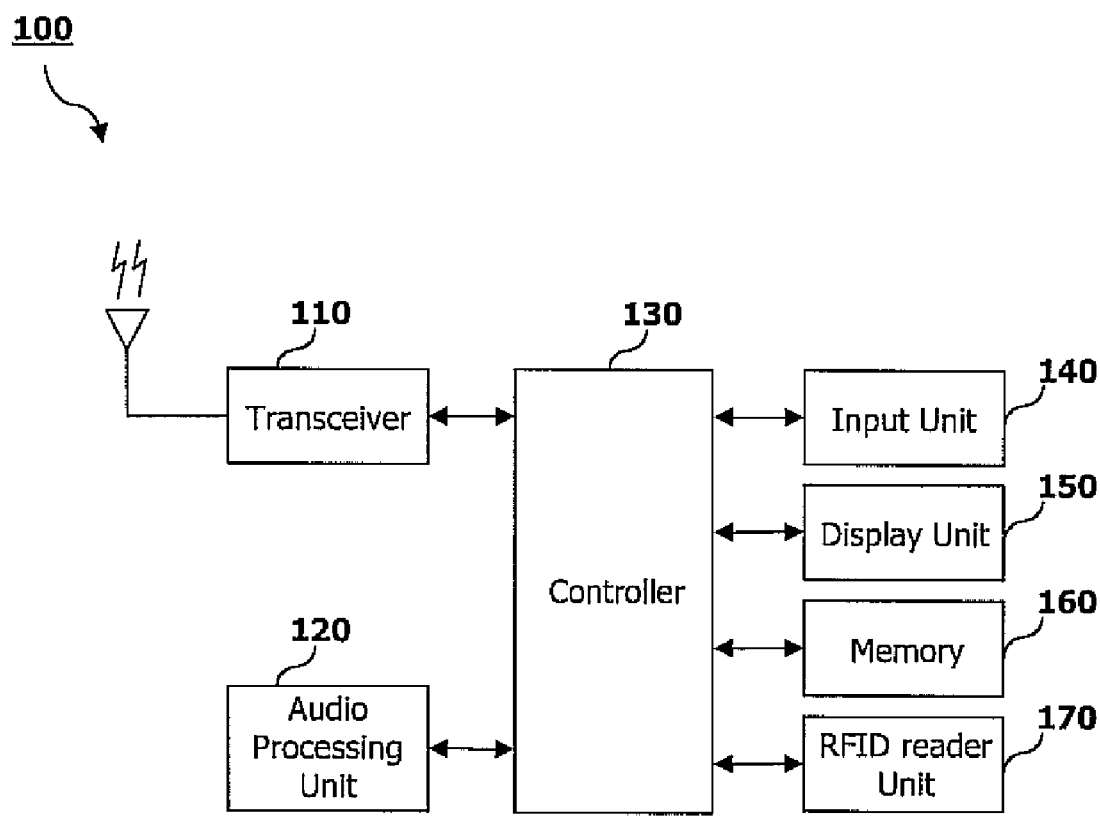
FIG. 1 is a block diagram illustrating the construction of a mobile communication terminal that provides an RFID technique according to one embodiment of the present invention.

FIG. 1 is a schematic block diagram illustrating the construction of a mobile communication terminal 100 for providing the RFID technique according to the present invention. As illustrated in FIG. 1, the mobile communication terminal 100 includes an RFID reader unit 170 that is provided with identification information from transmitting power to the RFID tag; a controller 130 for detecting a pre-set theme corresponding to the provided identification information and outputting a control signal based on the detected theme; and a display unit 150 and an audio processing unit 120 for setting one or more supplementary functions according to the control signal.

The mobile communication terminal 100 includes a memory 160 for storing one or more identification information and a pre-set theme corresponding to the identification information. The pre-set theme may include one or more supplementary functions related to text, audio and images.

Figure 2:
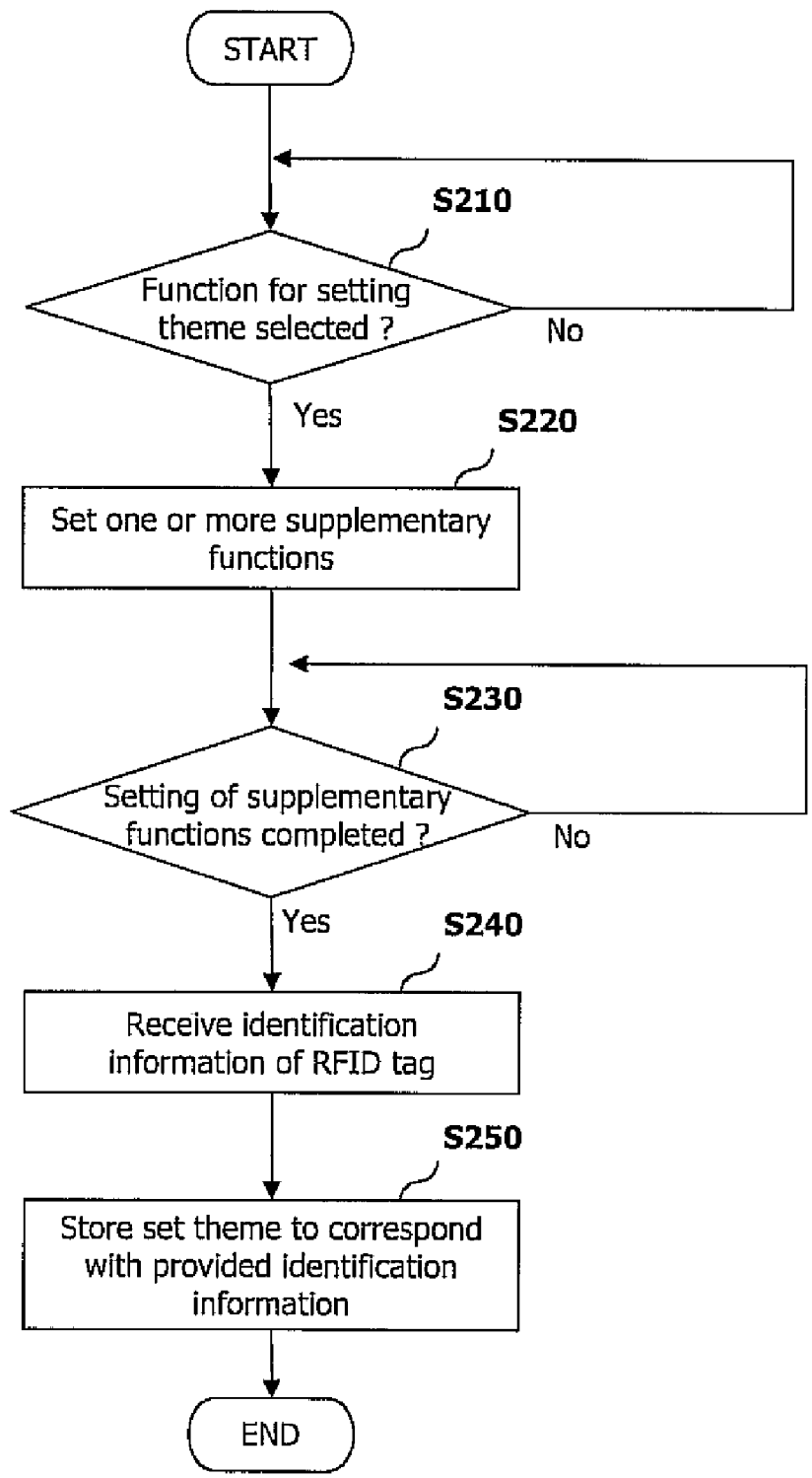
FIG. 2 is a flow chart illustrating a method of setting a theme of a mobile communication terminal according to one embodiment of the present invention.

A method for setting a theme of the mobile communication terminal 100 according to the present invention will be described with reference to FIG. 2. FIG. 2 is a flow chart illustrating a method for setting a theme of the mobile communication terminal according to the present invention.

As illustrated in FIG. 2, the method includes checking whether a function for setting a theme has been selected (step S210). When the function for setting the theme is selected, one or more supplementary functions are set (step S220).

It is then determined whether the setting of the supplementary functions has been completed (step S230). When the setting of the supplementary functions has been completed, identification information of an RFID tag is received (step S240) and the set theme is stored such that it corresponds to the provided identification information.

The mobile communication terminal 100 determines whether a function for setting a theme has been selected (step S210). The controller 130 can check whether the function for setting a theme has been selected via a menu selection using the input unit 140 or via a pre-set key.

When the function for setting a theme has been selected, the controller 130 sets one or more supplementary functions (step S220). The user can set one or more supplementary functions, such as a font, a bell sound, an incoming call notification (bell, tone, or other sounds), a background screen, a menu screen, an icon or colors, included in the function for setting a theme.

The controller 130 determines whether setting of the supplementary functions have been completed (step S230). When setting of the supplementary functions has been completed, the RFID reader unit 170 receives identification information from the RFID tag (step S240). The RFID reader unit 170 transmits an RF signal to the RFID tag and receives the identification information from the RFID tag via the transmitted RF signal.

The controller 130 stores the set theme such that it corresponds to the identification information (step S250). The controller 130 can store the identification information and the set theme including one or more supplementary functions corresponding to the identification information.

The mobile communication terminal 100 can change one or more supplementary functions according to the pre-set theme according to the provided identification information, install the RFID tag at a pre-set position and receive the identification information from the installed RFID tag. A method for providing an RFID technique of the mobile communication terminal 100 will be described with reference to FIG. 3.

Figure 3:
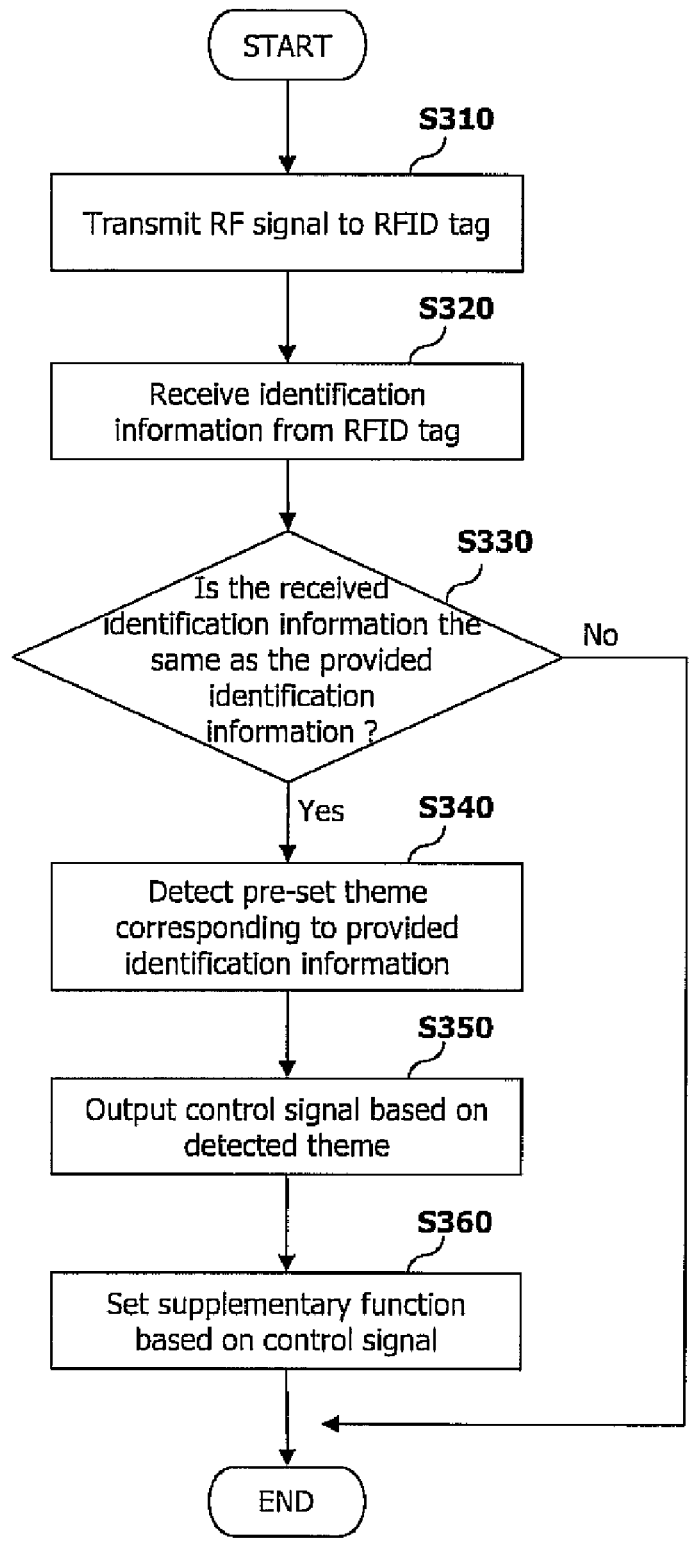
FIG. 3 is a flow chart illustrating a method of providing the RFID technique of a mobile communication terminal according to one embodiment of the present invention.

FIG. 3 is a flow chart illustrating a method of providing an RFID technique of the mobile communication terminal according to the present invention. As illustrated in FIG. 3, the method includes transmitting an RF signal to an RFID tag (step S310) and receiving identification information from the RFID tag via the transmitted RF signal (step S320).

It is then determined whether the received identification information matches the provided identification information (step S330). If the received identification information matches the provided identification information, a pre-set theme corresponding to the provided identification information is detected (step 340), a control signal based on the detected theme is output (step S350) and one or more supplementary functions are set according to the control signal (step S360).

The RFID reader unit 170 transmits the RF signal to the RFID tag (step S310) and receives the identification information from the RFID tag via the transmitted RF signal (step S320). The controller 130 then determines whether the received identification information matches the provided identification information (step S330). The controller 130 checks whether the received identification information matches the provided identification information in the memory 160.

If the received identification information matches the provided identification information in the memory 160, the controller detects the pre-set theme corresponding to the provided identification information from the memory (step S340) and outputs a control signal based on the detected theme (step S350).

The mobile communication terminal 100 then sets one or more supplementary functions according to the control signal (step S360). Specifically, the display unit 150 can change a supplementary function related to characters or images, such as a font, a background screen, a menu screen, an icon or colors, and the audio processing unit 120 can change a supplementary function related to audio, such as a bell sound or an incoming call notification.

A mobile communication terminal and method for providing the RFID technique according to the present invention provides an advantage in that the identification information is received from the RFID tag and a pre-set theme corresponding to the provided identification information is applied. User convenience is improved.

The foregoing embodiments and advantages are merely exemplary and are not to be construed as limiting the present invention. The present teaching can be readily applied to other types of apparatuses.

The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore all changes and modifications that fall within the metes and bounds of the claims, or equivalence of such metes and bounds are intended to be embraced by the appended claims.

What is claimed is:

1. A mobile communication terminal for providing an RFID (Radio Frequency Identification) technique, the mobile communication terminal comprising:
   an RFID reader unit configured to transmit an RF signal to an RFID tag; and
   a controller configured to preset at least one supplementary function corresponding to a function selected for presetting a theme,
   wherein the RFID reader unit receives first identification information from the RFID tag via the transmitted RF signal to complete presetting of the theme when the controller has preset the at least one supplementary function,
   wherein the controller detects the preset theme corresponding to second identification information received from the RFID tag that matches the first identification information, and outputs a control signal according to the detected preset theme.

2. The terminal of claim 1, further comprising:
   a memory configured to store the first identification information and the preset theme corresponding to the first identification information.

3. The terminal of claim 1, wherein the controller is further configured to set the at least one preset supplementary function according to the control signal.

4. The terminal of claim 3, wherein the at least one preset supplementary function is related to one of characters, audio and images.

5. The terminal of claim 4, wherein the at least one preset supplementary function is one of a font, a bell sound, an incoming call notification, a background screen, a menu screen, an icon and colors.

6. The terminal of claim 4, further comprising at least one of a display unit and an audio processing unit configured to receive the control signal from the controller to set the at least one preset supplementary function.

7. The terminal of claim 1, wherein the RFID reader unit is further configured to transmit power to the RFID tag.

8. The terminal of claim 1, wherein at least one RFID tag is installed at pre-set positions.

9. A method for providing an RFID technique in a mobile communication terminal, the method comprising:
   presetting at least one supplementary function corresponding to a function selected for presetting a theme;
   receiving first identification information from an RFID tag via a transmitted RF signal when presetting the at least one supplementary function has been completed;
   receiving second identification information from the RFID tag;
   detecting the preset theme when the first and second identification information match; and
   outputting a control signal according to the detected preset theme.

10. The method of claim 9, further comprising:
    storing the first identification information and the preset theme corresponding to the first identification information.

11. The method of claim 9, further comprising setting the at least one preset supplementary function according to the control signal.

12. The method of claim 11, wherein the at least one preset supplementary function is related to one of characters, audio and images.

13. The method of claim 12, wherein the at least one preset supplementary function is one of a font, a bell sound, an incoming call notification, a background screen, a menu screen, an icon and colors.

14. The method of claim 10, further comprising determining if the received second identification information matches the first identification information stored in memory.

15. The method of claim 9, further comprising transmitting power to the RFID tag.

16. The method of claim 9, further comprising installing at least one RFID tag at pre-set positions.

17. A method for providing an RFID technique in a mobile communication terminal, the method comprising:
    presetting at least one supplementary function corresponding to a function selected for presetting a theme;
    receiving first identification information from an RFID tag via a transmitted RF signal when presetting the at least one supplementary function corresponding to the selected function has been completed;

storing the first identification information and the preset theme corresponding to the first identification information;

receiving second identification information from the RFID tag;

determining that the received second identification information matches the received first identification information stored in memory;

detecting the preset theme corresponding to the matched identification information;

outputting a control signal according to the detected preset theme; and setting the at least one preset supplementary function according to the control signal.

18. The method of claim 17, wherein the at least one preset supplementary function is related to one of characters, audio and images.

19. The method of claim 18, wherein the at least one preset supplementary function is one of a font, a bell sound, an incoming call notification, a background screen, a menu screen, an icon and colors.

20. The method of claim 17, further comprising transmitting power to the RFID tag.

* * * * *